No. 106,560. PATENTED AUG. 23, 1870.
G. W. DICKINSON.
WEIGHING SCALE.
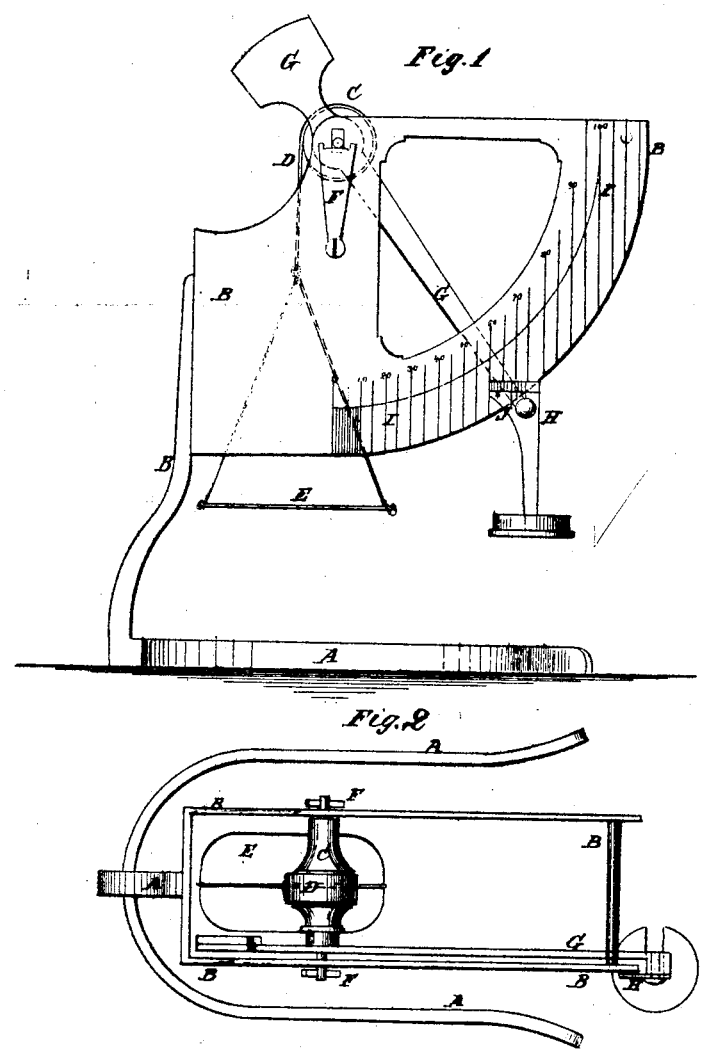

United States Patent Office.

GEORGE W. DICKINSON, OF CHARLESTON, ILLINOIS.

Letters Patent No. 106,560, dated August 23, 1870.

IMPROVEMENT IN WEIGHING-SCALES.

The Schedule referred to in these Letters Patent and making part of the same.

*To all whom it may concern:*

Be it known that I, GEORGE W. DICKINSON, of Charleston, in the county of Coles and State of Illinois, have invented a new and useful Improvement in Scales; and I do hereby declare that the following is a full, clear, and exact description thereof, which will enable others skilled in the art to make and use the same, reference being had to the accompanying drawing forming part of this specification, in which—

Figure 1 is a side view of my improved scale.
Figure 2 is a top view of the same.

Similar letters of reference indicate corresponding parts.

This invention relates to that old and well-known class of weighing devices which has the weight and scales balanced across a vibrating shaft and pulley, by means of a lever and flexible cord. In these devices a graduated and radially-rotated arc and a pointer are employed to indicate the different weights.

My improvement upon these consists in dispensing with the radial pointer altogether, and substituting a perpendicular pendant or vernier, which acts as pointer for the pounds and exhibits the ounce lines upon its own surface.

A represents the stand or pedestal, the base of which is made somewhat U-shaped, and from the middle part of the bend or bow of which projects the upright or shaft of the pedestal.

B is the frame of the scale, the side parts of which are made somewhat like a quadrant in shape.

C is a shaft, the journals of which pass through holes in the sides of the frame B, so that the axis of the said shaft C may be exactly in the center of the curved edges of said sides.

D is a band or strap, one end of which is attached to the middle part of the shaft C.

The strap D is wound one or more times around the shaft C, and from its other end is suspended the scale-pan E.

F are arms, the lower ends of which are pivoted to the sides of the frame B, and in their other or upper ends are formed long notches, in which the journals of the shaft or roller C rest, so that, as the said shaft is revolved, they may revolve in the said notches, while they are kept from moving forward by passing through holes in the sides of the frame B, as before described.

G is a lever, which is rigidly connected with the roller or shaft C, so as to be carried with said shaft in its revolution.

The lever G extends along the inner side of one of the side parts of the frame B, and to its outer end is pivoted a vernier, H, having a small weight-stand formed upon or attached to its lower end.

Along the curved edge of the side of the frame B is formed a scale, I, of division-marks, said marks being all vertical, and, consequently, parallel with each other. These division-marks indicate the pounds.

The fractions of a pound are read from the scale J of the division-marks, formed along the upper edge of the vernier H.

By this arrangement it will be observed that the same effect is produced as is produced by shifting the pea along the beam of a steelyard.

Having thus described my invention—

I claim as new and desire to secure by Letters Patent—

The combination of the weighted pendant H, attached to the end of the radial lever, and provided with vertical lines to mark the ounces, with an arc-plate, B, having perpendicular lines of subdivision for the pounds, all as shown and described.

GEO. W. DICKINSON.

Witnesses:
JO. DAYTON,
JOSEPH W. DIKOB.